United States Patent
Zou

(10) Patent No.: US 12,254,606 B2
(45) Date of Patent: Mar. 18, 2025

(54) IMAGE DISPLAY METHOD AND APPARATUS, TERMINAL DEVICE, STORAGE MEDIUM, AND PROGRAM PRODUCT

(71) Applicant: Huawei Technologies Co., Ltd., Shenzhen (CN)

(72) Inventor: Tao Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 17/998,554

(22) PCT Filed: Apr. 26, 2021

(86) PCT No.: PCT/CN2021/089955
§ 371 (c)(1),
(2) Date: Nov. 11, 2022

(87) PCT Pub. No.: WO2021/227859
PCT Pub. Date: Nov. 18, 2021

(65) Prior Publication Data
US 2023/0214968 A1    Jul. 6, 2023

(30) Foreign Application Priority Data

May 13, 2020   (CN) .......................... 202010399978.5
Jul. 31, 2020   (CN) .......................... 202010762090.3

(51) Int. Cl.
*H04N 23/63*   (2023.01)
*G06T 3/40*    (2006.01)
*G06T 5/80*    (2024.01)

(52) U.S. Cl.
CPC ................. *G06T 5/80* (2024.01); *G06T 3/40* (2013.01); *H04N 23/63* (2023.01); *G06T 2207/30201* (2013.01)

(58) Field of Classification Search
CPC ........................... H04N 23/631; H04N 23/633
(Continued)

(56) References Cited

U.S. PATENT DOCUMENTS 10,574,895 B2    2/2020   Lee et al.
10,762,799 B1*   9/2020   Yang ...................... G09B 5/06
(Continued)

FOREIGN PATENT DOCUMENTS

CN    102197918 A    9/2011
CN    102664825 A    9/2012
(Continued)

*Primary Examiner* — Anthony J Daniels
(74) *Attorney, Agent, or Firm* — Slater Matsil, LLP

(57) ABSTRACT

This application relates to the field of terminal technologies, and provides an image display method and apparatus, a terminal device, a storage medium, and a program product. The method includes: obtaining, in response to a first instruction entered by a user, a first offset corresponding to a first display specification; and displaying a first target image on a display based on the first display specification, where the first target image is obtained by cropping a first original image based on the first display specification, an offset between a center of the first target image and a center of the first original image is the first offset, and the first original image is an image shot by using a front-facing camera as a center.

19 Claims, 14 Drawing Sheets

(58) Field of Classification Search
USPC .................................................. 348/333.01
See application file for complete search history.

(56) References Cited

U.S. PATENT DOCUMENTS

| | | | | |
|---|---|---|---|---|
| 2007/0040033 | A1* | 2/2007 | Rosenberg | G06F 3/0481 |
| | | | | 235/462.36 |
| 2012/0257000 | A1* | 10/2012 | Singhal | H04N 7/183 |
| | | | | 348/14.02 |
| 2013/0229482 | A1* | 9/2013 | Vilcovsky | H04N 7/144 |
| | | | | 348/14.07 |
| 2017/0257543 | A1* | 9/2017 | Rowles | H04N 23/51 |
| 2018/0278879 | A1 | 9/2018 | Saban et al. | |
| 2020/0059596 | A1* | 2/2020 | Yoo | G06T 7/50 |

FOREIGN PATENT DOCUMENTS

| | | | |
|---|---|---|---|
| CN | 106896999 A | * | 6/2017 |
| EP | 3404619 A1 | | 11/2018 |

* cited by examiner

IMAGE DISPLAY METHOD AND APPARATUS, TERMINAL DEVICE, STORAGE MEDIUM, AND PROGRAM PRODUCT

CROSS-REFERENCE TO RELATED APPLICATIONS

This application is a national stage of International Application No. PCT/CN2021/089955, filed on Apr. 26, 2021, which claims priority to Chinese Patent Application No. 202010762090.3, filed on Jul. 31, 2020, and Chinese Patent Application No. 202010399978.5, filed on May 13, 2020. All of the aforementioned applications are hereby incorporated by reference in their entireties.

TECHNICAL FIELD

This application pertains to the field of terminal technologies, and in particular, relates to an image display method and apparatus, a terminal device, a storage medium, and a program product.

BACKGROUND

Mirrors are necessary in daily life for people. In particular, many users carry mirrors with them to check the appearance at any time. As functions of a terminal device become increasingly diversified, the terminal device can provide a virtual mirror that shoots a user image by using a front-facing camera and displays the shot user image on a display of the terminal device, to implement a function of a physical mirror (that is, a real mirror). In this way, a user can use the terminal device as a physical mirror without carrying a physical mirror specially. However, compared with a physical mirror, a virtual mirror usually has a poor image display effect so far.

SUMMARY

Embodiments of this application provide an image display method and apparatus, a terminal device, and a storage medium, to improve an image display effect of a virtual mirror.

According to a first aspect, this application provides an image display method, applied to a terminal device. The terminal device includes a front-facing camera and a display. The method includes: obtaining, in response to a first instruction entered by a user, a first offset corresponding to a first display specification; and displaying a first target image on the display based on the first display specification, where the first target image is obtained by cropping a first original image based on the first display specification, an offset between a center of the first target image and a center of the first original image is the first offset, and the first original image is an image shot by using the front-facing camera as a center.

Based on the image display method provided in this application, a virtual mirror is used as an example. When running the virtual mirror, the terminal device may offset the center of the first target image based on the first offset corresponding to the first display specification, so that the center of the first target image obtained by cropping the first original image is offset from the center of the first original image (that is, a location of the front-facing camera) to an area that is of the first original image and that is opposite the display. Therefore, the first target image displayed by the virtual mirror is more similar to an image displayed by a physical mirror. This improves an image display effect of the virtual mirror and improves user experience.

Optionally, the first offset includes an offset component in a first direction and an offset component in a second direction, and the first direction and the second direction are perpendicular to each other.

Based on this optional manner, the two offset components in mutually perpendicular directions are set, so that it can be ensured that the center of the first target image can be accurately offset, and offset precision of the center of the first target image is improved. Optionally, the first offset includes a straight-line distance and an offset direction.

Based on this optional manner, the straight-line distance and the offset direction are set, so that it can be ensured that the center of the first target image can be accurately offset, and offset precision of the center of the first target image is improved.

Optionally, before the displaying the first target image on the display based on the first display specification, the method further includes: obtaining a tilt angle of the terminal device; and correcting the first offset based on the tilt angle, where the offset between the center of the first target image and the center of the first original image is a corrected first offset.

Based on this optional manner, when the user tilts the terminal device when using the virtual mirror, the offset is corrected by measuring the tilt angle of the terminal device in a use process of the user, to reduce a difference between the first target image displayed by the virtual mirror and an image displayed by a physical mirror, and further improve an image display effect of the virtual mirror and improve user experience.

Optionally, the method further includes: obtaining, in response to a second instruction entered by the user, a second offset corresponding to a second display specification, where the second instruction instructs to switch the first display specification to the second display specification; and displaying a second target image on the display based on the second display specification, where the second target image is obtained by cropping a second original image based on the second display specification, an offset between a center of the second target image and a center of the second original image is the first offset, and the second original image is an image shot by using the front-facing camera as a center.

Based on this optional manner, a plurality of display specifications may be set for the virtual mirror, and a corresponding offset is configured for each display specification. The user may randomly switch the display specification, so that user experience is improved.

Optionally, the first offset is obtained from a server.

Based on this optional manner, an updated first offset may be obtained from the server at any time, to ensure accuracy of the first offset.

Optionally, the first offset is obtained from preset camera parameters, the camera parameters include at least one display specification and an offset corresponding to each display specification, and the first display specification is one of the at least one display specification.

Based on this optional manner, the plurality of display specifications may be set for the virtual mirror, and a corresponding offset is configured for each display specification, to ensure that a target image displayed in a display region based on each display specification is more similar to an image displayed by a physical mirror. This improves an image display effect of the virtual mirror and improves user experience.

According to a second aspect, this application provides an image display apparatus, used in a terminal device. The terminal device includes a front-facing camera and a display. The image display apparatus includes:

an obtaining unit, configured to obtain, in response to a first instruction entered by a user, a first offset corresponding to a first display specification; and a display unit, configured to display a target image on the display based on the first display specification, where the target image is obtained by cropping an original image based on the first display specification, an offset between a center of the target image and a center of the original image is the first offset, and the first original image is an image shot by using the front-facing camera as a center.

According to a third aspect, this application provides a terminal device, including a front-facing camera, a display, a processor, a memory, and a computer program that is stored in the memory and that can be run on the processor. When the processor executes the computer program, the terminal device implements the following functions:

obtaining, in response to a first instruction entered by a user, a first offset corresponding to a first display specification; and displaying a first target image on the display based on the first display specification, where the first target image is obtained by cropping a first original image based on the first display specification, an offset between a center of the first target image and a center of the first original image is the first offset, and the first original image is an image shot by using the front-facing camera as a center.

Optionally, when the processor executes the computer program, the terminal device further implements the following functions:

before the first target image is displayed on the display based on the first display specification, obtaining a tilt angle of the terminal device; and correcting the first offset based on the tilt angle, where the offset between the center of the first target image and the center of the first original image is a corrected first offset.

Optionally, when executing the computer program, the processor further implements the following functions: obtaining, in response to a second instruction entered by the user, a second offset corresponding to a second display specification, where the second instruction instructs to switch the first display specification to the second display specification; and displaying a second target image on the display based on the second display specification, where the second target image is obtained by cropping a second original image based on the second display specification, an offset between a center of the second target image and a center of the second original image is the first offset, and the second original image is an image shot by using the front-facing camera as a center.

Based on the first aspect to the third aspect, optionally, the first offset includes an offset component in a first direction and an offset component in a second direction, and the first direction and the second direction are perpendicular to each other.

Optionally, the first offset includes a straight-line distance and an offset direction.

Optionally, the first offset is obtained from a server.

Optionally, the first offset is obtained from preset camera parameters, the camera parameters include at least one display specification and an offset corresponding to each display specification, and the first display specification is one of the at least one display specification.

According to a fourth aspect, this application provides a computer-readable storage medium. The computer-readable storage medium stores a computer program, and when the computer program is executed by a processor, the image display method according to any one of the first aspect or the optional manners of the first aspect is implemented.

According to a fifth aspect, an embodiment of this application provides a computer program product. When the computer program product runs on a terminal device, the terminal device performs the image display method according to any one of the first aspect or the optional manners of the first aspect.

For technical effects of the second aspect to the fifth aspect provided in this application, refer to technical effects of the first aspect or each optional manner of the first aspect. Details are not described herein again.

DETAILED DESCRIPTION OF ILLUSTRATIVE EMBODIMENTS

A virtual mirror provided by a terminal device is an application (Application, App) that can simulate a function of a physical mirror. The virtual mirror shoots a user image by using a front-facing camera of the terminal device, and then displays the shot user image on a display of the terminal device, so that a user can use the display of the terminal device as a mirror surface of a physical mirror. However, an image display effect of the virtual mirror is usually not completely similar to an image display effect of the physical mirror. Compared with an image presented by the physical mirror, an image presented by the virtual mirror usually deviates. Therefore, the image display effect of the virtual mirror is usually poor, affecting use experience of the user.

Figure 1:
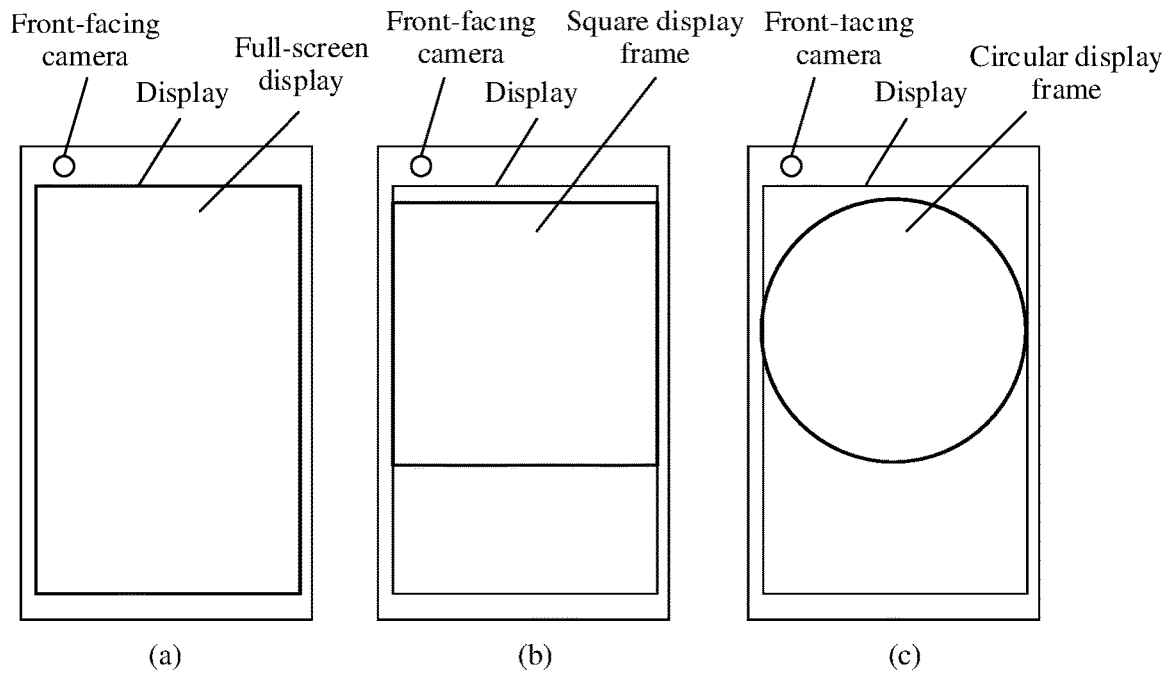
FIG. 1 is a schematic diagram of a displaying area of a virtual mirror according to an embodiment of this application.

Comparison between an image display effect of a virtual mirror and an image display effect of a physical mirror is described below by using an example in which a user paints lipstick by using a virtual mirror and a physical mirror that have a same display area. A display area of the physical mirror is a mirror surface area of the physical mirror. A display area of the virtual mirror is a display area of an image display frame that is set for the virtual mirror. For example, as shown in (a) in FIG. 1, when full-screen display is set for the virtual mirror, the display area of the virtual mirror is an area of a display. As shown in (b) in FIG. 1, when a square display frame is set for the virtual mirror, the display area of the virtual mirror is a display area of the square display frame. As shown in (c) in FIG. 1, when a circular display frame is set for the virtual mirror, the display area of the virtual mirror is a display area of the circular display frame. In this example, it is assumed that the mirror surface area of the physical mirror is the same as an area of a display of a terminal device, and the display area of the virtual mirror is the area of the display.

For ease of description, the following constructs a plane L as a reference plane to describe relative locations of the physical mirror, the virtual mirror, lips of a user, and a lip image. It may be understood that the plane L is merely a reference plane, and is not an actual plane.

Figure 2:
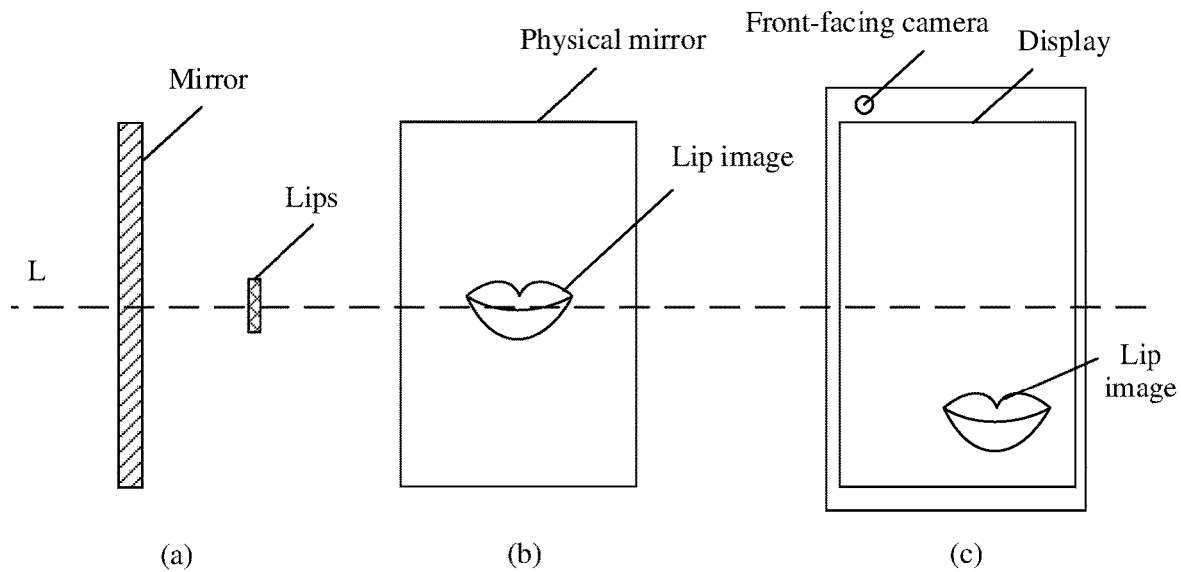
FIG. 2 is a diagram of image display comparison between a virtual mirror and a physical mirror according to an embodiment of this application.

It is assumed that relative locations of the mirrors and the lips are shown in (a) in FIG. 2 based on a side-view direction of the mirrors (including the physical mirror and the virtual mirror) and the lips of the user. Both mirror surfaces (that is, a mirror surface of the physical mirror and the display of the terminal device) and the lips are perpendicular to the plane L. Based on the relative locations shown in (a) in FIG. 2, for description, a lip image shown in (b) in FIG. 2 (in a front-view direction of the physical mirror) is used as an example of a lip image displayed on the mirror surface of the physical mirror. It is assumed that the lip image displayed on the physical mirror is also located on the plane L. For the virtual mirror, it is assumed that a front-facing camera of the terminal device is close to an upper bezel of the terminal device and is located on the upper left of the display. In this case, based on the relative locations shown in FIG. 1, an image displayed on the virtual mirror is shown in (c) in FIG. 2 (in a front-view direction of the display of the terminal device). The lip image displayed on the virtual mirror deviates from the plane L, and is located in a lower right region in a display region of the virtual mirror (that is, the display of the terminal device).

Figure 3:
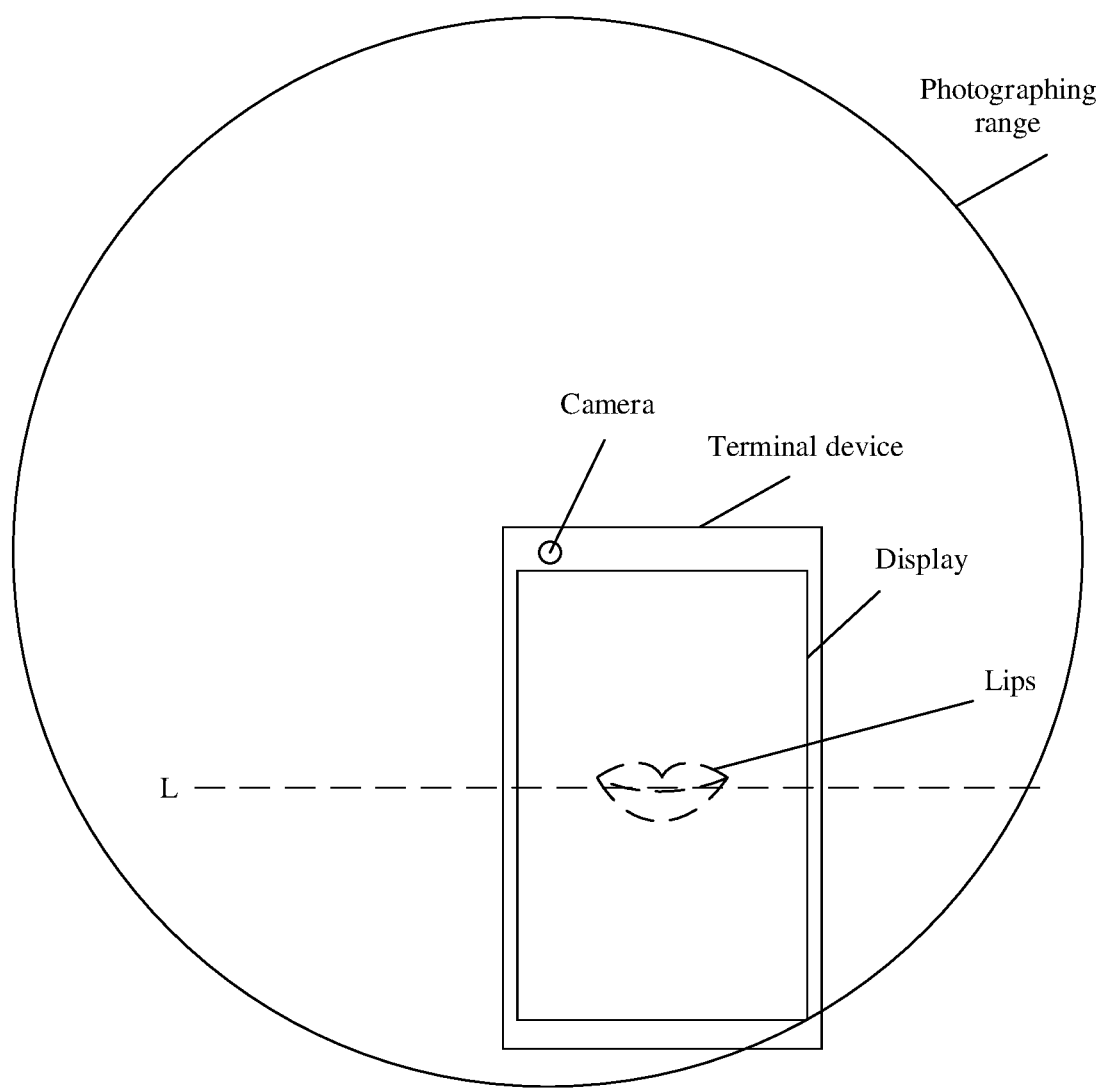
FIG. 3 is a schematic diagram of an imaging range of a virtual mirror according to an embodiment of this application.

A reason for such a difference is that an imaging range of the physical mirror is a range that the mirror surface can irradiate. However, an imaging range of the virtual mirror is a photographing range of the front-facing camera of the terminal device. For example, as shown in FIG. 3, the imaging range of the virtual mirror is a range that can be photographed by the front-facing camera by using a location of the front-facing camera as a center. Because the front-facing camera of the terminal device is located on the upper left of the display, when the display of the terminal device is opposite the lips of the user relative to the plane L, an original image shot by the front-facing camera is shown in (a) in FIG. 4, and a lip image is located in a lower right region of the original image. Then, the terminal device crops the original image based on a center of the original image and a specified display specification (for example, a size and a shape), to obtain a target image, and displays the target image on the display. In the original image, the lip image is located in the lower right region of the original image. Therefore, as shown in (b) in FIG. 4, in the target image obtained by cropping based on the center of the original image, a lip image is also located in a lower right region of the target image and deviates from a center of the target image (that is, the center of the original image). It can be learned that, compared with the lip image displayed by the physical mirror, the lip image displayed by the virtual mirror in the display region has an offset, and image composition is poor. Therefore, a display effect of the virtual mirror is poor.

Figure 5:
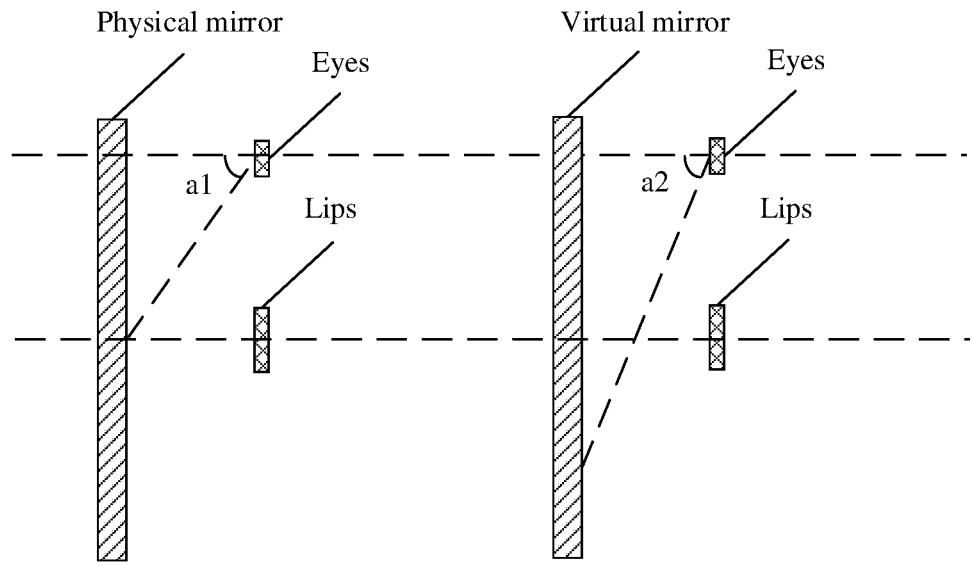
FIG. 5 is a schematic diagram of observation angles of a virtual mirror and a physical mirror according to an embodiment of this application.

Further, when looking in a mirror (for example, a physical mirror or a virtual mirror), a user usually aligns a mirror surface with a region that needs to be observed, and a line of sight of the user is concentrated on a corresponding location on the mirror surface. For example, in FIG. 2, the user aligns the mirror surface with the lips, so that the mirror surface and the lips are opposite on the plane L. In addition, a line of sight of the user is concentrated on a location at which the plane L and the mirror surface intersect. Therefore, when the user uses the physical mirror, a location at which a lip image is presented on the mirror surface of the physical mirror coincides with a location at which the line of sight of the user reaches, so that the user can observe conveniently. When using the virtual mirror, the user also aligns the mirror surface (that is, the display) with the lips. However, a location at which a lip image is presented on the display usually deviates from the plane L. For example, when the front-facing camera of the terminal device is close to the upper bezel of the terminal device and is located on the upper left of the display, as shown in (b) in FIG. 2, the lip image presented on the display deviates toward the lower right relative to the plane L. As a result, the user needs to move a line of sight downward, and an observation angle becomes larger, resulting in poor use experience. For example, as shown in FIG. 5, an observation angle a2 of a line of sight of the user that uses the virtual mirror is larger than an observation angle a1 of a line of sight of the user that uses the physical mirror. Consequently, eye discomfort of the user is caused, and observation is inconvenient.

In some cases, limited by a display area and pixels of the terminal device and relative locations of the front-facing camera of the terminal device and the lips, even if the physical mirror can present a complete lip image, a lip image displayed by the virtual mirror may be an incomplete image, or even a lip image cannot be displayed. In this case, the user needs to move the terminal device downward, so that the front-facing camera of the terminal device is aligned with the lips, and the lip image is presented on the display. Thus, the user also needs to move a line of sight downward. Consequently, an observation angle becomes larger, and eye discomfort of the user is caused. Therefore, when using the virtual mirror, the user usually has poor use experience.

Similarly, if the front-facing camera of the terminal device is close to a lower bezel of the terminal device and is located below the display (for example, located at a middle position, a left position, or a right position below the display), the user needs to move a line of sight upward relative to a line of sight on the physical mirror. In some cases, for example, when the user observes a position (for example, an eyebrow, an eye, or a forehead) on an upper part of the face by using a mirror, an observation angle of a line of sight of the user that uses the virtual mirror is usually larger than an observation angle of a line of sight of the user that uses the physical mirror. Similarly, eye discomfort of the user is caused, and observation is inconvenient.

Therefore, this application provides an image display method. A center of a first target image is offset based on a first offset corresponding to a first display specification, so that the center of the first target image obtained by cropping a first original image (an image shot by using a front-facing camera as a center) is offset from a location of the front-facing camera to a region (equivalent to a region displayed by a mirror surface of a physical mirror) in which the first original image is opposite a display. Therefore, the first target image is more similar to an image displayed by the physical mirror, so that an image display effect of a virtual mirror is improved and user experience is improved.

With reference to specific embodiments, examples are used below to describe a system architecture, an application scenario, and a specific implementation to which the image display method provided in this application is applicable.

Figure 6:
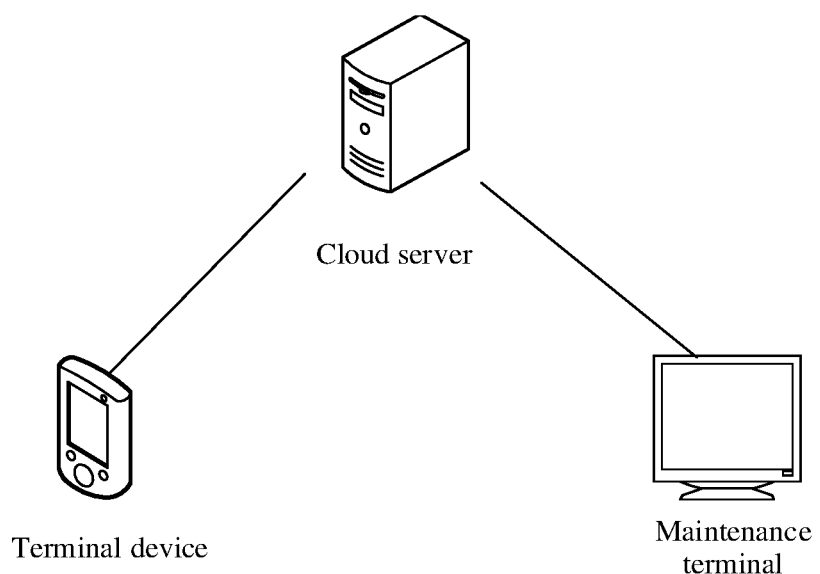
FIG. 6 is a schematic diagram of an application scenario according to an embodiment of this application.

In an example, the image display method provided in this application may be applicable to a system architecture shown in FIG. 6. FIG. 6 is a schematic diagram of a system architecture of a virtual mirror according to this application. The system architecture includes a server-side device and a terminal-side device. The server-side device includes a server that provides a virtual mirror, and camera parameters of terminal devices of different models are maintained in the server. The terminal-side device includes a terminal device on which a virtual mirror is installed, and a maintenance terminal on which an administrator maintains a virtual mirror.

The terminal device on which a virtual mirror is installed may be any type of terminal device including a front-facing camera, for example, a mobile phone or a tablet computer. The maintenance terminal may be a computer device such as a notebook computer, a tablet computer, a smartphone, or a desktop computer. In embodiments of this application, the front-facing camera is a camera facing a user in a photographing process. The server may be any type of server that can provide a virtual mirror, for example, a cloud server. This is not limited in this application.

The administrator logs in to a web page of the server through the maintenance terminal to manage the camera parameters. The terminal device models and the camera parameters are uploaded to the server through the maintenance terminal. The server stores and maintains the parameters. After enabling the virtual mirror, the terminal device may download camera parameters corresponding to a model of the terminal device from the server. Then, the terminal device displays an image based on the downloaded camera parameters to simulate a function of a physical mirror.

In another example, the image display method provided in this application may alternatively be independently completed by the terminal device. Camera parameters corresponding to a model of the terminal device is preset in the terminal device, and the terminal device may directly display an image based on the preset camera parameters, to simulate a function of a physical mirror.

The camera parameters may include an offset of the front-facing camera of the terminal device relative to a display region of the terminal device. Based on the offset, a center of a target image obtained by cropping an original image shot by the front-facing camera may be offset from a location of the front-facing camera to a center of the display region, or be offset to a location closer to the center of the display region than the location of the front-facing camera. A specific location may be set based on an actual requirement. This is not limited in this application.

For example, a specific value of the offset may be determined based on a display specification used for the virtual mirror. The display specification herein may refer to a size and a shape of the display region, a location of the display region on the display, and the like. A corresponding offset may be set for each display specification.

The center of the display region is used as an example. If a display specification shown in (a) in FIG. 1, that is, full-screen display, is used for the virtual mirror, a location of a center of a display region is located at a center of the display as shown in (a) in FIG. 7. If a display specification shown in (b) in FIG. 1, that is, a square display frame that uses a width of the display as a side length, is used for the virtual mirror, and the square display frame is located at a location on the display close to the front-facing camera, a location of a center of a display region is located at a center of the square display frame as shown in (b) in FIG. 7. If a display specification shown in (c) in FIG. 1, that is, a circular display frame that uses a width of the display as a diameter, is used for the virtual mirror, and the circular display frame is located at a location on the display close to the front-facing camera, a location of a center of a display region is located at a center of the circular display frame as shown in (c) in FIG. 7.

The offset may include two components that are perpendicular to each other. For example, the offset may include an offset component (assumed to be denoted as Y) in a second direction and an offset component (assumed to be denoted as X) in a first direction. The second direction and the first direction are perpendicular to each other. It may be understood that, based on the location of the front-facing camera, when the center of the target image is offset by Y in the second direction and is offset by X in the first direction, the center of the target image may be offset to the center of the display region, or be offset to the location closer to the center of the display region than the location of the front-facing camera.

Figure 7:
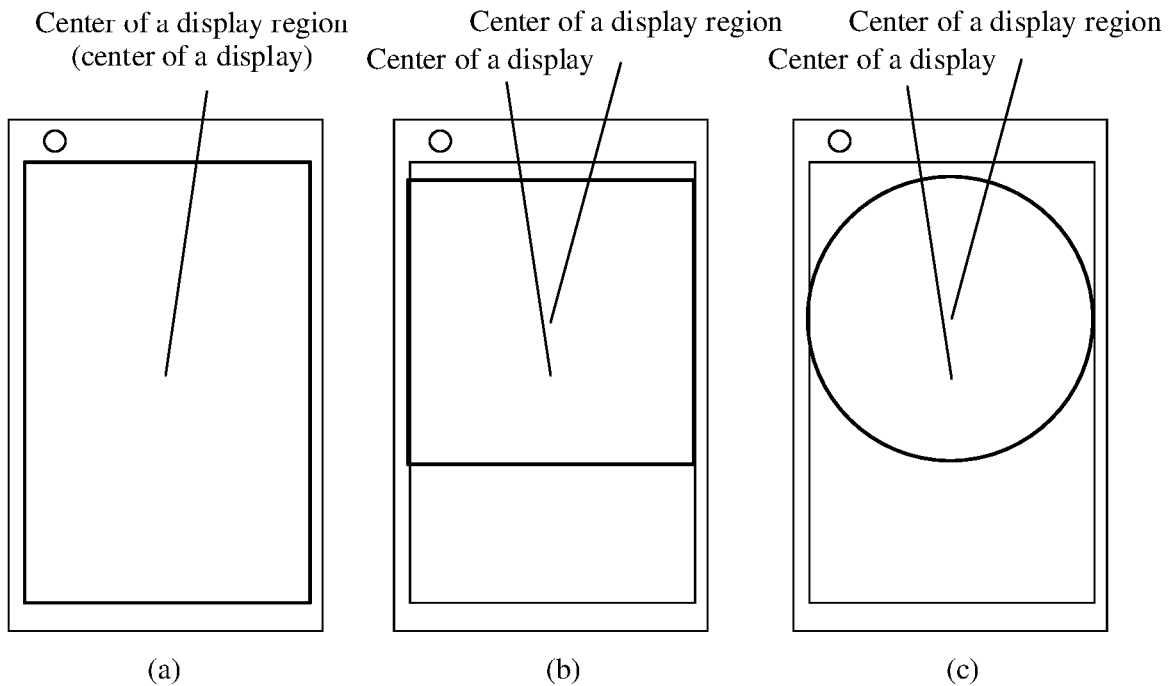
FIG. 7 is a schematic diagram of a center of a display region according to an embodiment of this application.
Figure 8:
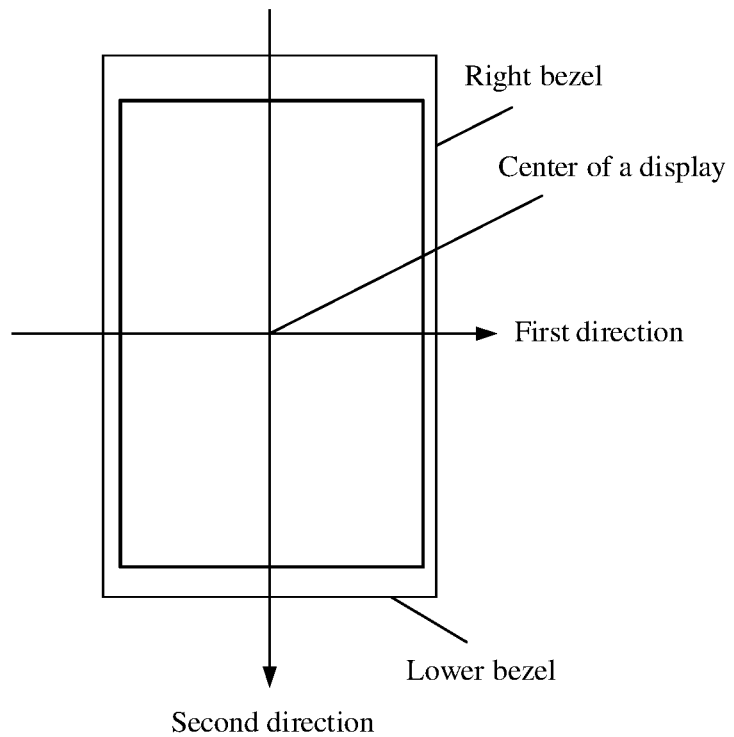
FIG. 8 is a schematic diagram of a direction of an offset according to an embodiment of this application.

For example, as shown in FIG. 8, the center of the display shown in (a) in FIG. 7 is used as an example. The second direction is a direction that is parallel to a surface of the display and points to a lower frame of the terminal device, and the first direction may be a direction that is parallel to the surface of the display and points to a right bezel of the terminal device. In this case, corresponding offsets may be determined based on sizes of terminal devices of various models, locations of centers of display regions, and locations of front-facing cameras respectively. For example, based on FIG. 8, FIG. 9 shows offsets of front-facing cameras relative to centers of display regions on several terminal devices of different models respectively.

Figure 9:
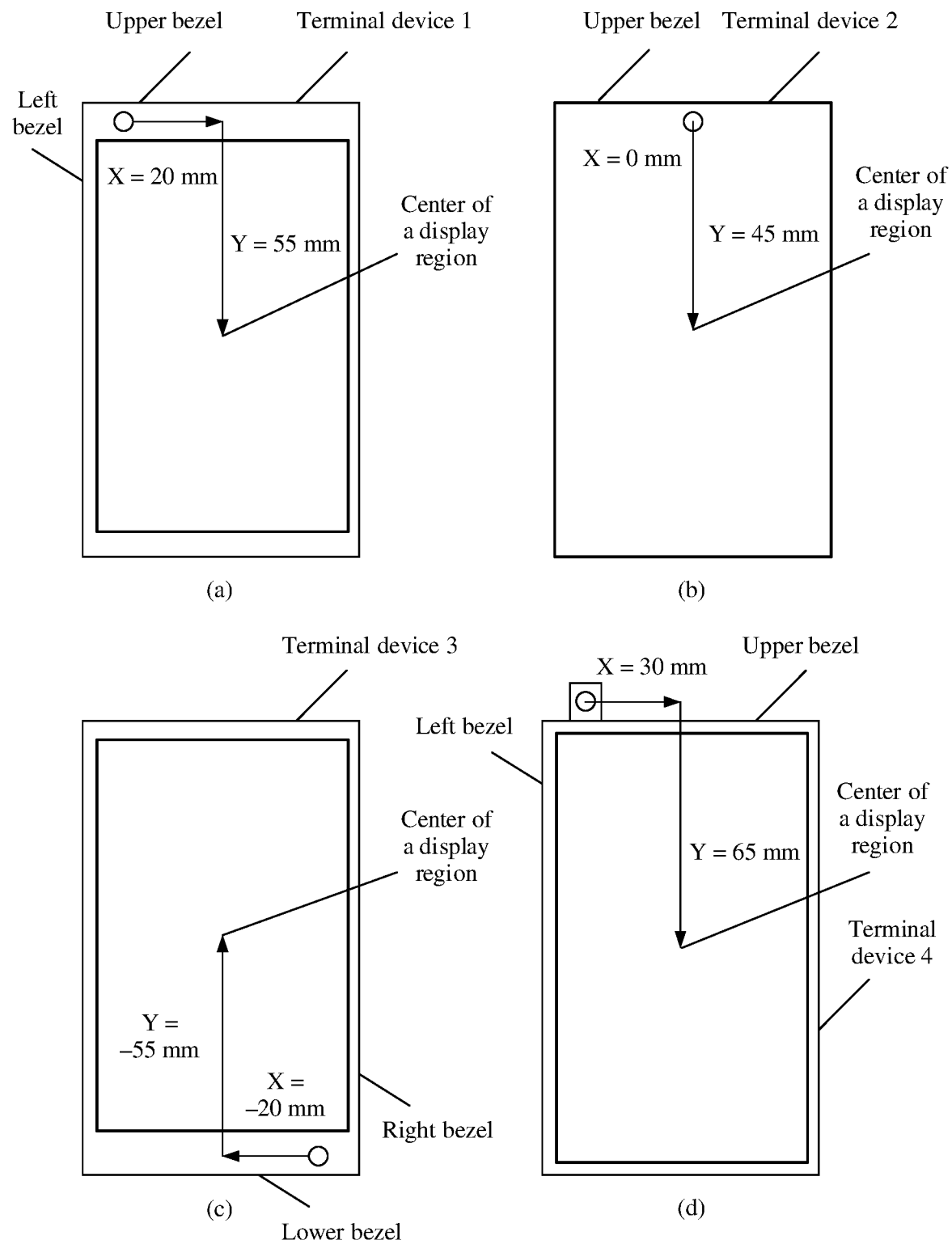
FIG. 9 is a schematic diagram of a representation manner of an offset according to an embodiment of this application.

As shown in (a) in FIG. 9, a front-facing camera of a terminal device 1 is located at a location above a display and close to a left bezel. If the front-facing camera is offset, based on the location of the front-facing camera, by 20 millimeters (mm) in the first direction and by 55 mm in the second direction, a location of the front-facing camera may be offset to a center of a display region. In this case, an offset of the front-facing camera of the terminal device 1 relative to the center of the display region includes "X=20 mm, Y=55 mm".

As shown in (b) in FIG. 9, a terminal device 2 is a bezel-less screen, and a front-facing camera of the terminal device 2 is located in the middle of a region above a display. If the front-facing camera is not offset in the first direction based on the location of the front-facing camera but is offset by 45 mm in the second direction, a location of the front-facing camera may be offset to a center of a display region. In this case, an offset of the front-facing camera of the terminal device 2 relative to the center of the display region includes "X=0 mm, Y=45 mm".

As shown in (c) in FIG. 9, a front-facing camera of a terminal device 3 is located at a location below a display and close to a right bezel. If the front-facing camera is offset, based on the location of the front-facing camera, by 20 mm in the reverse direction of the first direction and 55 mm in the reverse direction of the second direction, a location of the front-facing camera may be offset to a center of a display region. In this case, an offset of the front-facing camera of the terminal device 3 relative to the center of the display region includes "X=−20 mm, Y=−55 mm".

As shown in (d) in FIG. 9, a front-facing camera of a terminal device 4 is a pop-up camera. When the front-facing camera is invoked, the front-facing camera of the terminal device 4 rises and protrudes from a location that is at an upper bezel of a display and close to a left bezel. If the front-facing camera is offset, based on the location of the front-facing camera, by 30 mm in the first direction and by 65 mm in the second direction, a location of the front-facing camera may be offset to a center of a display region. In this case, an offset of the front-facing camera of the terminal device 4 relative to the center of the display region includes "X=30 mm, Y=65 mm".

Figure 10:
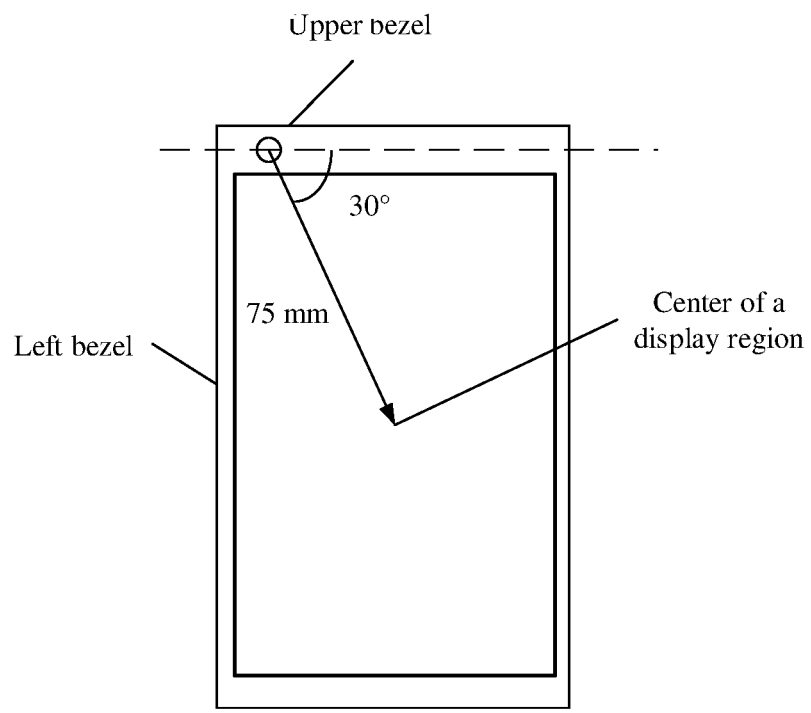
FIG. 10 is a schematic diagram of another representation manner of an offset according to an embodiment of this application.

Optionally, an offset may alternatively be represented by using an offset direction and a straight-line distance. For example, it is assumed that, a straight line parallel to an upper bezel of the terminal device is used as a reference, a location at which the front-facing camera is located is a center of a circle, and a rotation angle used during rotating in a clockwise direction represents an offset direction. As shown in FIG. 10, a front-facing camera of a terminal device 5 is located at a location above a display and close to a left bezel. If the front-facing camera is offset, based on the location of the front-facing camera, by 75 mm in an offset direction with a rotation angle of 30°, the front-facing camera may be offset to a center of a display region. In this case, an offset of the front-facing camera of the terminal device 5 relative to the center of the display region includes "30°, 75 mm".

Certainly, in addition to the foregoing two representation manners, the offset of the front-facing camera may alternatively be represented in another manner. This is not limited in this application.

Figure 11:
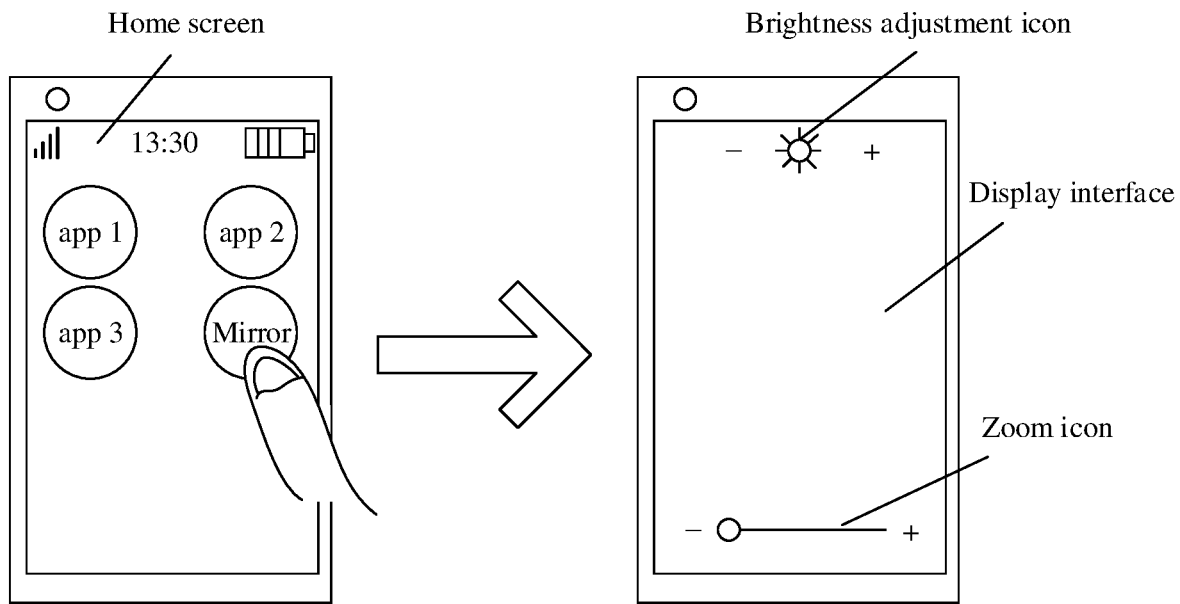
FIG. 11 is a schematic diagram of enabling a virtual mirror according to an embodiment of this application.

In embodiments of this application, the virtual mirror may be a mirror app that specifically provides a function of simulating a physical mirror. For example, as shown in FIG. 11, an icon of a mirror app is displayed on a home screen of a terminal device. After detecting that a user taps the icon of the mirror app, the terminal device may invoke a front-facing camera to display a display interface of a virtual mirror, and display, based on the image display method provided in this application, an image shot by the front-facing camera, to simulate a function of a physical mirror. A brightness adjustment icon, a zoom icon, and the like may be further displayed on the display interface of the virtual mirror.

Figure 12:
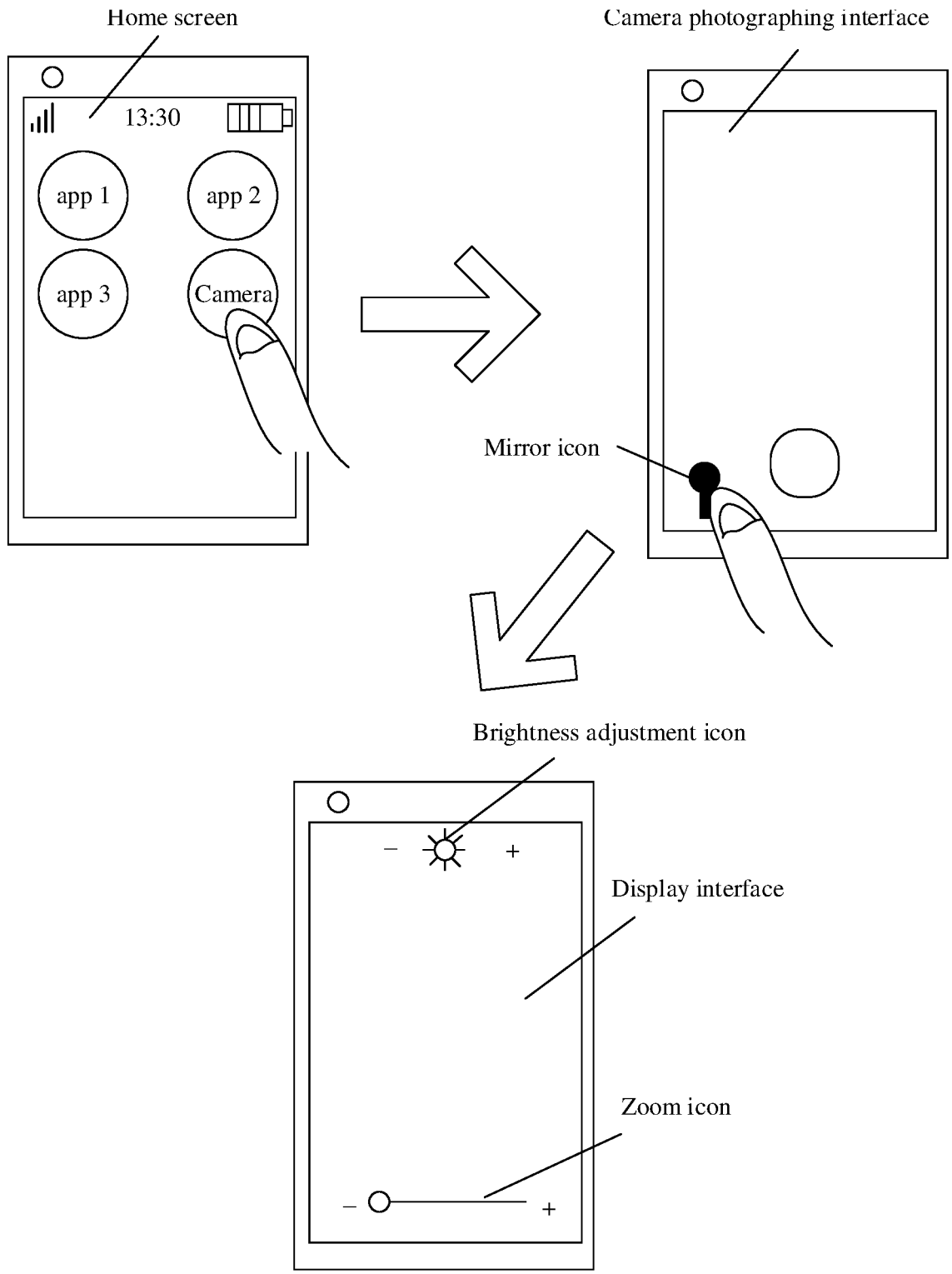
FIG. 12 is another schematic diagram of enabling a virtual mirror according to an embodiment of this application.

Alternatively, the virtual mirror may be an application option that is included in another app and that can provide a function of simulating a physical mirror. For example, as shown in FIG. 12, an icon of a photography app (for example, a camera) is displayed on a display of a terminal device. After detecting that a user taps the icon of the camera, the terminal device displays a camera photographing interface. For example, a mirror icon is displayed on the camera photographing interface. When the terminal device detects that the user taps a "mirror" icon, the terminal device invokes a front-facing camera to display a display interface of a virtual mirror, and displays, based on the image display method provided in this application, an image shot by the front-facing camera, to simulate a function of a physical mirror.

The foregoing mirror app that provides a function of simulating a physical mirror and the another app that includes an application option that can provide a function of simulating a physical mirror may be pre-installed or be downloaded by a user.

It may be understood that, a technology of the foregoing virtual mirror is that a terminal device obtains a user image by using a front-facing camera, and displays the user image on a display.

A specific example is used below. The image display method provided in this application is described below by using an example.

Figure 13:
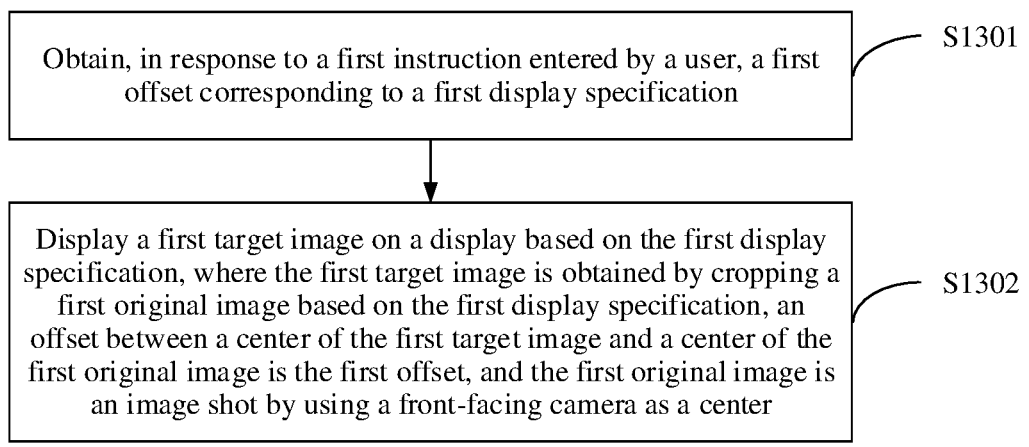
FIG. 13 is a flowchart of an image display method according to an embodiment of this application.

FIG. 13 is a flowchart of an embodiment of an image display method according to this application. The method includes the following steps.

S1301: Obtain, in response to a first instruction entered by a user, a first offset corresponding to a first display specification.

The first instruction may be an instruction used to enable a virtual mirror function. For example, based on the virtual mirror shown in FIG. 11, when a terminal device detects, on a home screen, that the user taps an icon of a mirror app, the terminal device may obtain the first instruction. Alternatively, based on the virtual mirror shown in FIG. 12, when a terminal device detects, in a camera photographing interface, that the user taps a mirror icon, the terminal device may obtain the first instruction.

In a possible implementation, after installing the virtual mirror, the terminal device may download, from a server each time the terminal device detects the first instruction, an offset corresponding to a model of the terminal device. That is, a request message is sent to the server, where the request message is used to request the server to deliver camera parameters. The server determines, based on the model of the terminal device carried in the request message, camera parameters corresponding to the model of the terminal device, and sends the camera parameters to the terminal device, where the camera parameters include the offset corresponding to the first display specification.

Alternatively, after the virtual mirror is installed and each time the virtual mirror is updated, when the terminal device detects the first instruction for the mirror for the first time, the terminal device may download camera parameters corresponding to the model of the terminal device from a server, and locally store the camera parameters. From the second time, each time the first instruction is detected, the terminal device may obtain the first offset corresponding to the first display specification from the locally stored camera parameters.

Certainly, the camera parameters may alternatively be preset in the terminal device, and do not need to be downloaded from the server. The terminal device directly obtains, from the preset camera parameters, the first offset corresponding to the first display specification.

For example, it is assumed that an offset includes an offset component X and an offset component Y, and display specifications include a circular display frame, a square display frame, and full-screen display. Camera parameters may be shown in the following Table 1.

TABLE 1

| Display specification | X (unit: mm) | Y (unit: mm) |
|---|---|---|
| Circular display frame | 30 | 60 |
| Square display frame | 30 | 60 |
| Full-screen display | 30 | 65 |

The first display specification may be a default display specification. The default display specification may be a fixed display specification. It is assumed that full-screen display is set to the default display specification, and each time the first instruction is detected, it is determined that the first display specification is the full-screen display.

Alternatively, if a plurality of display specifications are set for the virtual mirror, the default display specification may alternatively be a display specification used when the virtual mirror is used for the last time before the first instruction is detected. For example, after the first instruction is detected, it is determined that a display specification most recently used by the virtual mirror before the first instruction is detected is a circular display frame. In this case, the terminal device may determine that the first display specification is the circular display frame.

S1302: Display a first target image on a display based on the first display specification, where the first target image is obtained by cropping a first original image based on the first display specification, an offset between a center of the first target image and a center of the first original image is the first offset, and the first original image is an image shot by using a front-facing camera as a center.

After the front-facing camera obtains the first original image, the terminal device may first determine the center of the first target image in the first original image based on the first display specification and the first offset. Then, the first target image is obtained by cropping the first original image based on the center of the first target image and the first display specification.

Figure 4:
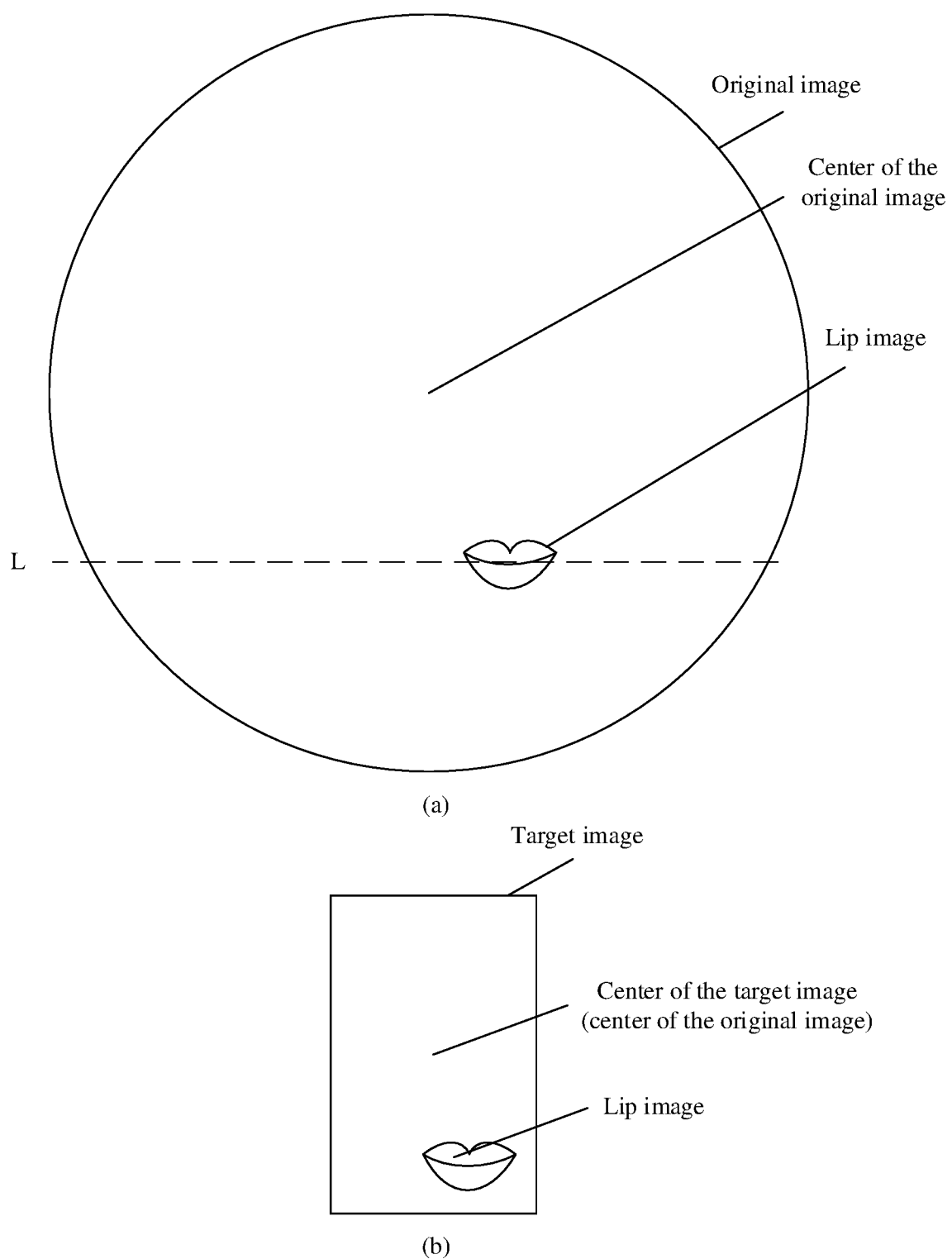
FIG. 4 is a schematic diagram of a principle of obtaining a target image in the current technology.
Figure 14:
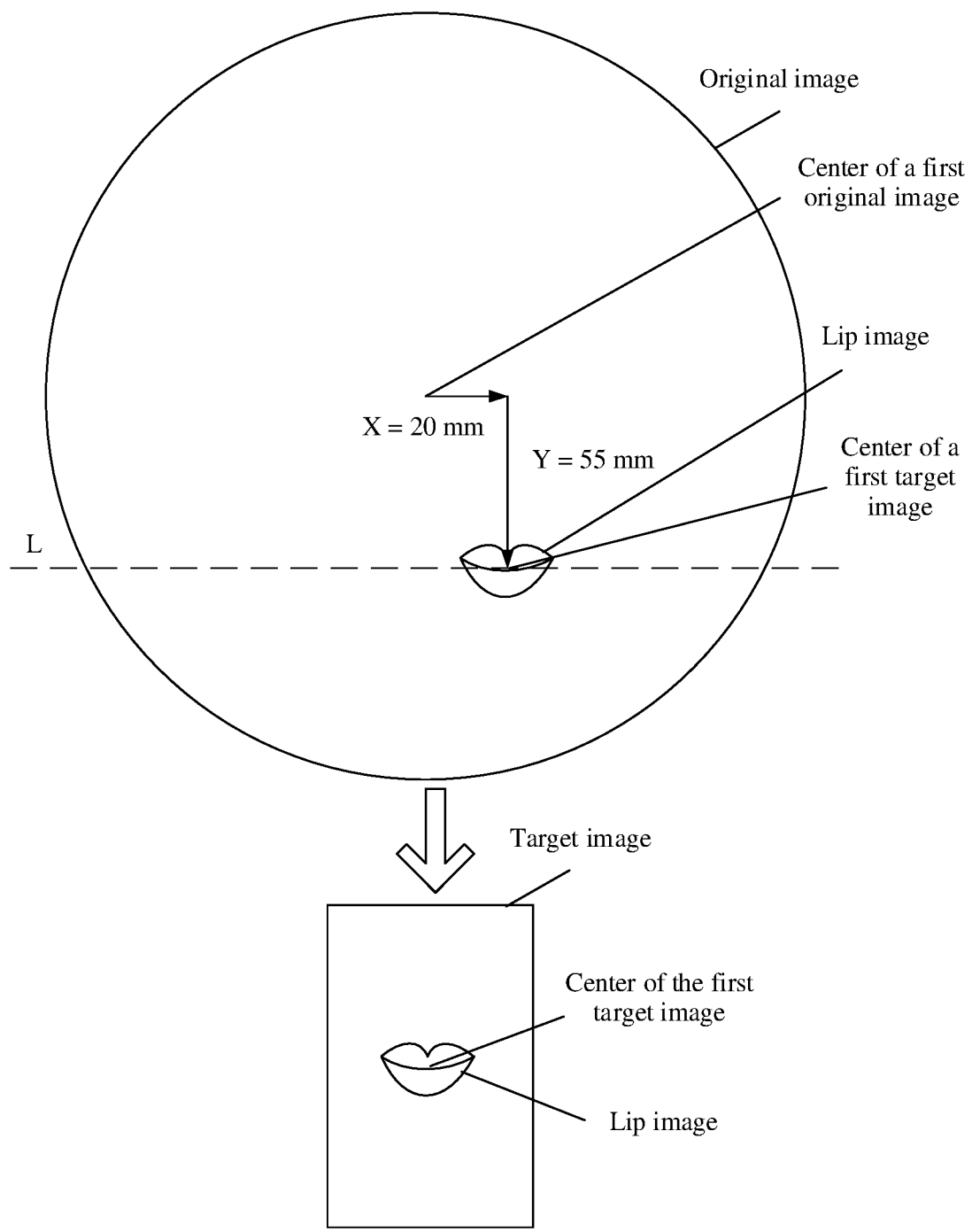
FIG. 14 is a schematic diagram of a principle of obtaining a target image according to an embodiment of this application.

The relative locations of the mirror surface and the lips of the user shown in (a) in FIG. 2, the original image shown in (a) in FIG. 4, and the terminal device 4 shown in (a) in FIG. 9 are used as examples. It is determined that the first display specification is full-screen display, and the corresponding first offset is "X=20 mm, Y=55 mm". After the front-facing camera obtains the first original image shown in (a) in FIG. 4, as shown in FIG. 14, it is determined, based on the offset "X=20 mm, Y=55 mm", that a location that is obtained through offsetting 20 mm from the center of the first original image in the first direction and offsetting 55 mm from the center of the first original image in the second direction is the center of the first target image. Then, the first target image is obtained by cropping the first original image based on the center of the first target image and the display specification of full-screen display.

In this case, the center of the first target image is located on a plane L, that is, a lip image in the first target image is located in the center of the first target image. After obtaining the first target image, the terminal device sends the first target image to the display, and controls the display to display the first target image based on the display specification of full-screen display. It is clear that, because the center of the first target image is opposite a center of the display and is located on the plane L, the lip image in the first target image displayed on the display is located on the plane L. Therefore, the center of the first target image is offset based on the first offset corresponding to the first display specification, so that the center of the first target image is offset from a location of the center of the first original image to a location closer to a center of a display region. Therefore, compared with the target image shown in (b) in FIG. 4, the first target image obtained based on the image display method provided in this application is more similar to the lip image displayed by the physical mirror shown in (b) in FIG. 2. Image composition of the first target image displayed by the virtual mirror is improved, so that a display effect of the virtual mirror is improved.

Optionally, in a possible scenario, when looking in a mirror by using the terminal device, the user may tilt the terminal device. Therefore, when running the virtual mirror, the terminal device may further correct the first offset by measuring a tilt angle of the terminal device in a use process of the user, so that the first target image finally displayed by the terminal device is more similar to an image displayed by a physical mirror. This further improves a display effect of the virtual mirror.

For example, when running the virtual mirror, the terminal device obtains data from a built-in direction sensor (for example, a gyroscope, an acceleration sensor, or a magnetic induction sensor), and then performs conversion calculation on the obtained data to obtain the tilt angle of the terminal device. For example, the first offset includes an offset component X in a second direction and an offset component Y in a first direction. Then, the terminal device may convert the data obtained from the direction sensor into a tilt angle in the second direction and a tilt angle in the first direction. Then, the offset component Y in the second direction is corrected based on the tilt angle in the second direction, and the offset component X in the first direction is corrected based on the tilt angle in the first direction.

Figure 15:
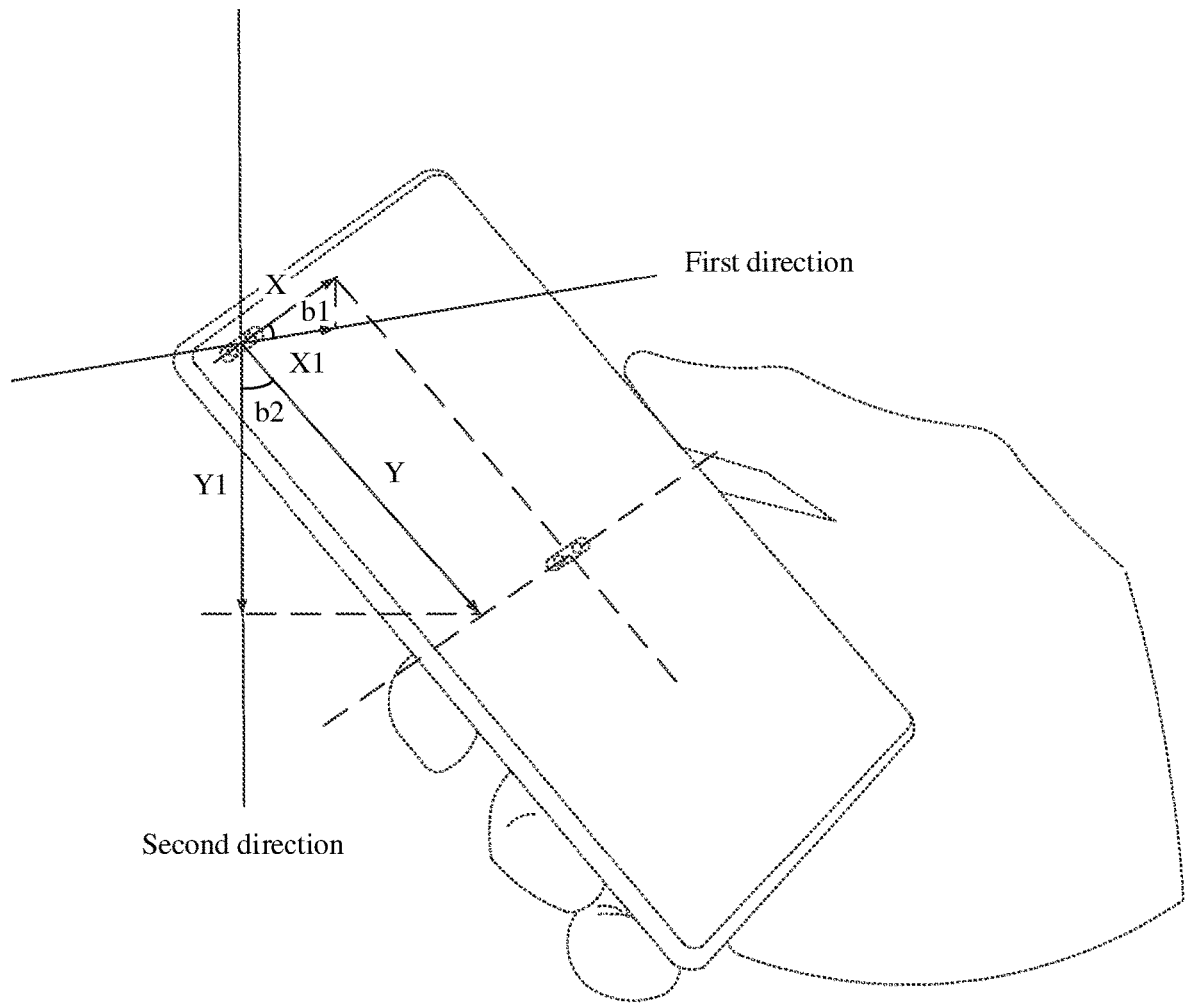
FIG. 15 is a schematic diagram of offset correction according to an embodiment of this application.

The terminal device 1 shown in (a) in FIG. 9 is used as an example. The terminal device 1 has a specific tilt angle when being held by a user. For example, as shown in FIG. 15, a tilt angle of a display of the terminal device in the first direction is b1, and a tilt angle of the display in the second direction is b2.

The terminal device corrects X based on b1, and corrects Y based on b2. Assuming that corrected X is represented as X1, X1=X*cosine(b1). If corrected Y is represented as Y1, Y1=X*cosine(a2). After correction, a corrected first offset includes X1 and Y1.

After the terminal device obtains the corrected first offset, the terminal device may determine a center of the first target image based on the corrected first offset. Then, the target image is obtained by cropping the original image based on the center of the target image and the first display specification, and the target image is displayed on the display. In this example, in a case that the user tilts the terminal device when using the virtual mirror, the offset is corrected by measuring the tilt angle of the terminal device in the use process of the user, to reduce a difference between the target image displayed by the virtual mirror and an image displayed by a physical mirror, and further improve an image display effect of the virtual mirror and improve user experience.

Figure 16:
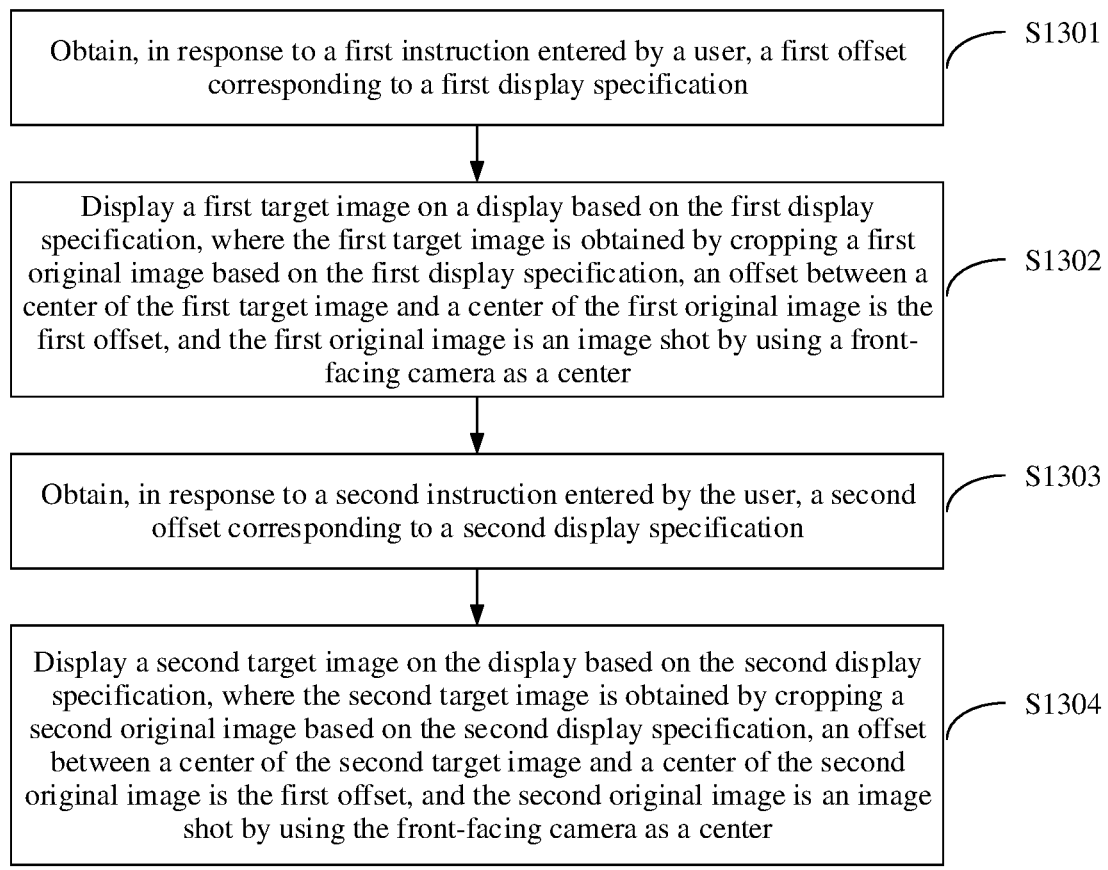
FIG. 16 is a flowchart of another image display method according to an embodiment of this application.

In an embodiment, if a plurality of display specifications are set for a virtual mirror, when using the terminal device to look in a mirror, the user may further randomly switch a display specification. For example, based on FIG. 13, as shown in FIG. 16, after step S1302, the image display method provided in this application further includes the following steps.

S1303: Obtain, in response to a second instruction entered by the user, a second offset corresponding to a second display specification.

The second instruction instructs to switch the first display specification to the second display specification.

Figure 17:
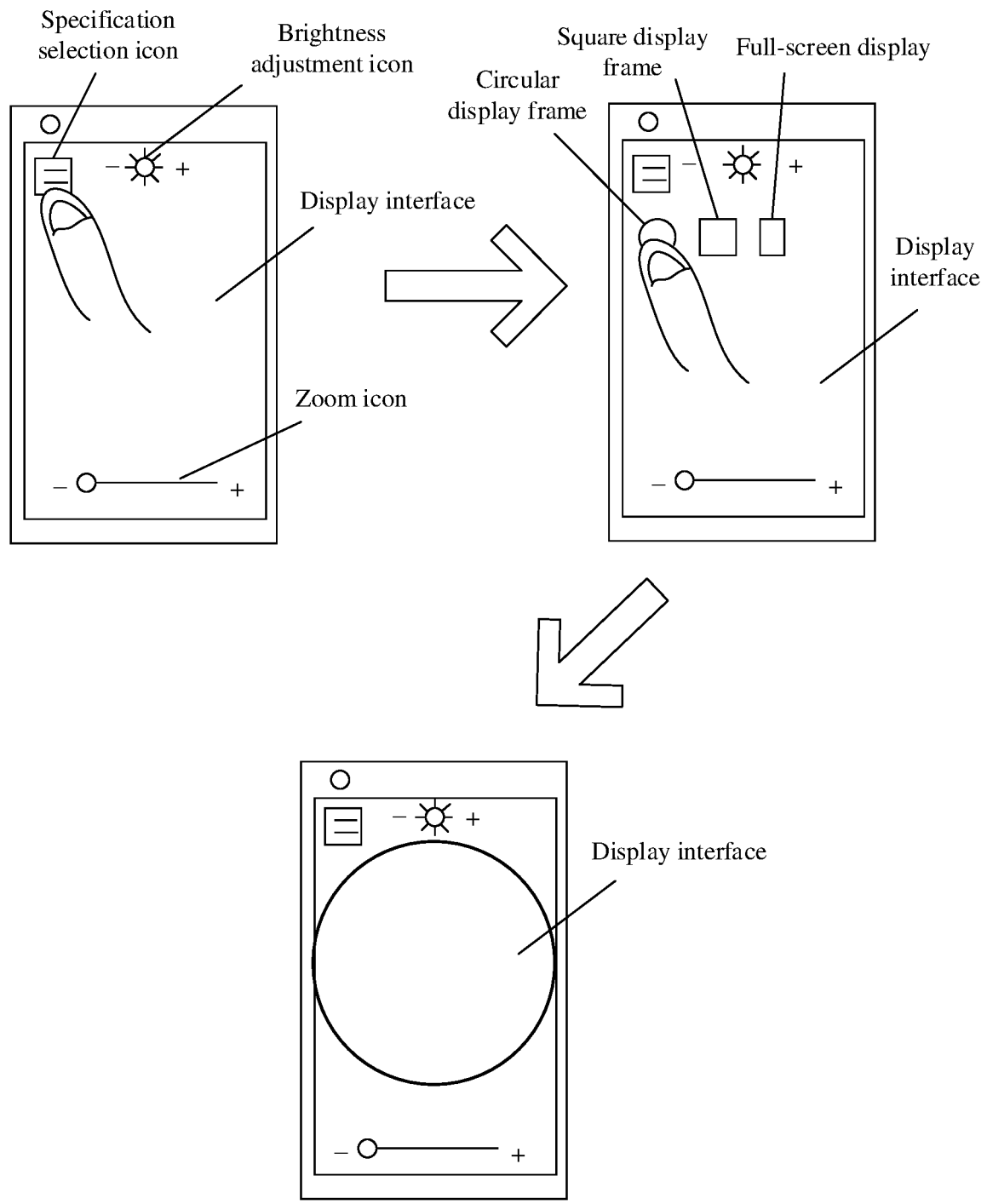
FIG. 17 is a schematic diagram of switching a display specification of a virtual mirror according to an embodiment of this application.

For example, as shown in FIG. 17, a specification selection icon is set in a display interface of the virtual mirror. It is assumed that the first display specification that the user initially uses is full-screen display. The user taps the specification selection icon when the user needs to switch the display specification. The terminal device displays specification options based on the user operation, including an icon of a circular display frame, an icon of a square display frame, and an icon of full-screen display. It is assumed that the user taps the icon of the circular display frame. In this case, the terminal device detects the second instruction. In response to the second instruction, the terminal device determines that the second display specification is the circular display frame, determines, from the camera parameters, a second offset "X=30 mm, Y=60 mm" corresponding to the circular display frame, and displays the circular display frame in the display interface of the virtual mirror.

S1304: Display a second target image on the display based on the second display specification, where the second target image is obtained by cropping a second original image based on the second display specification, an offset between a center of the second target image and a center of the second original image is the first offset, and the second original image is an image shot by using the front-facing camera as a center.

It may be understood that, after the virtual mirror is enabled, an original image obtained by the front-facing camera changes in real time. Similar to responding to the first instruction, after obtaining the second original image by using the front-facing camera, the terminal device may first determine the center of the second target image in the second original image based on the second display specification and the second offset. Then, the second target image is obtained by cropping the second original image based on the center of the second target image and the second display specification.

In this example, the virtual mirror can support switching between the plurality of display specifications, so that user experience is further improved.

It should be noted that, in the foregoing embodiments, the term "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word "example", "for example", or the like is intended to present a related concept in a specific manner. The ordinal numbers such as "first" and "second" mentioned shall be understood as being merely used for differentiation unless the numbers definitely indicate a sequence according to the context.

Unless otherwise specified, "/" in this specification usually indicates an "or" relationship between associated objects. For example, A/B may indicate A or B. The term "and/or" describes only an association relationship between the associated objects and indicates that three relationships may exist. For example, A and/or B may indicate the following cases: Only A exists, both A and B exist, and only B exists. In addition, in the descriptions of this application, "a plurality of" means two or more.

Figure 18:
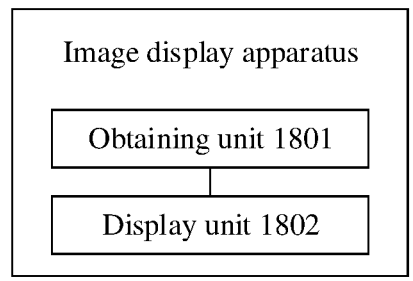
FIG. 18 is a schematic diagram of a structure of an image display apparatus according to an embodiment of this application.

Corresponding to the image display method in the foregoing embodiment, FIG. 18 is a block diagram of a structure of an image display apparatus according to an embodiment of this application. For ease of description, only a part related to this embodiment of this application is shown.

The image display apparatus is used in a terminal device, for example, may be a chip or a processor in the terminal device, or may be a function module in the processor. The terminal device includes a front-facing camera and a display. Refer to FIG. 18. The image display apparatus includes:

an obtaining unit 1801, configured to obtain, in response to a first instruction entered by a user, a first offset corresponding to a first display specification; and a display unit 1802, configured to display a first target image on the display based on the first display specification, where the first target image is obtained by cropping a first original image based on the first display specification, an offset between a center of the first target image and a center of the first original image is the first offset, and the first original image is an image shot by using the front-facing camera as a center.

Optionally, the first offset includes an offset component in a first direction and an offset component in a second direction, and the first direction and the second direction are perpendicular to each other.

Optionally, the first offset includes a straight-line distance and an offset direction.

Optionally, the obtaining unit 1801 is further configured to: before the display unit 1802 displays the first target image on the display based on the first display specification, obtain a tilt angle of the terminal device; and correct the first offset based on the tilt angle, where the offset between the center of the first target image displayed by the display unit 1802 and the center of the first original image is a corrected first offset.

Optionally, the obtaining unit 1801 is further configured to obtain, in response to a second instruction entered by the user, a second offset corresponding to a second display specification, where the second instruction instructs to switch the first display specification to the second display specification.

The display unit 1802 is further configured to display a second target image on the display based on the second display specification, where the second target image is obtained by cropping a second original image based on the second display specification, an offset between a center of the second target image and a center of the second original image is the first offset, and the second original image is an image shot by using the front-facing camera as a center.

Optionally, the first offset is obtained from a server.

Optionally, the first offset is obtained from preset camera parameters, the camera parameters include at least one display specification and an offset corresponding to each display specification, and the first display specification is one of the at least one display specification.

Figure 19:
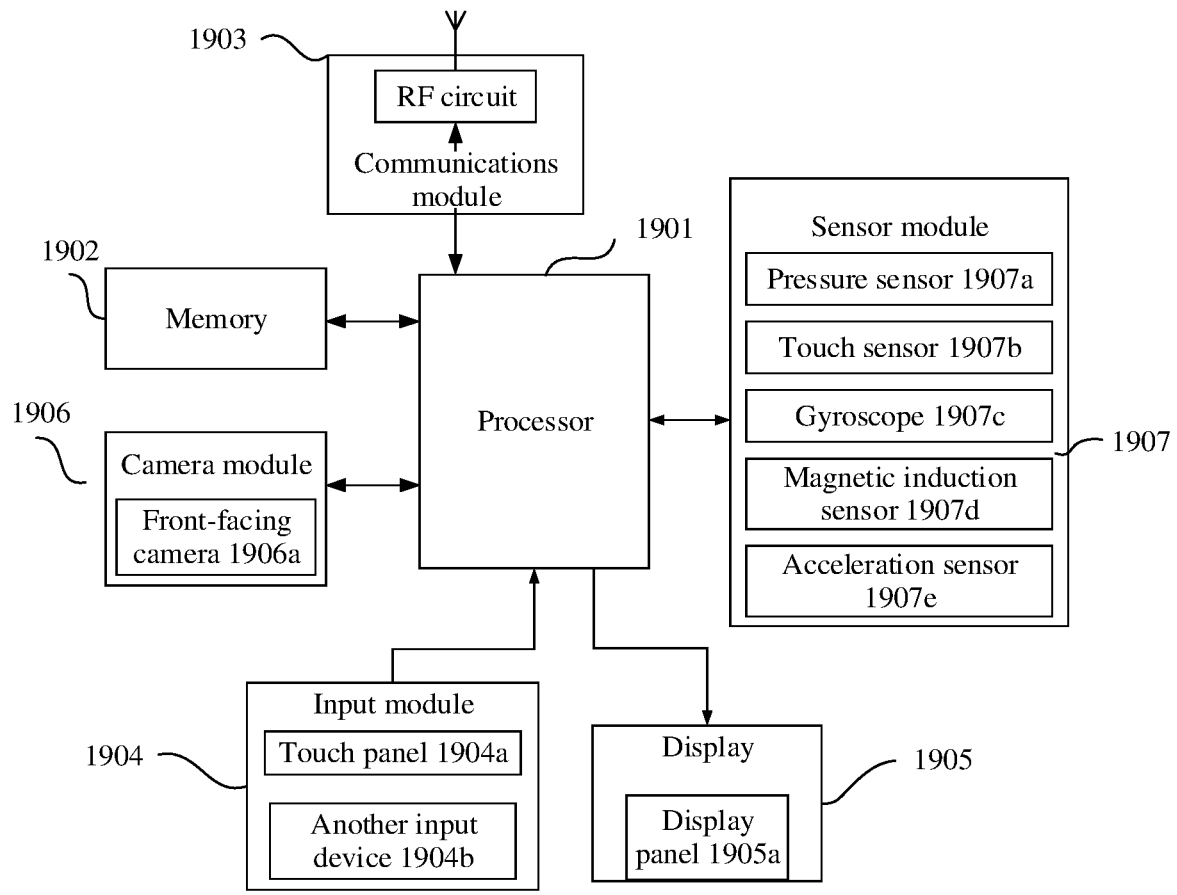
FIG. 19 is a schematic diagram of a structure of a terminal device according to an embodiment of this application.

FIG. 19 is a schematic diagram of a structure of a terminal device according to this application. The terminal device may be a terminal device that has a front-facing camera and a display and in which a virtual mirror can be installed, for example, a mobile phone, a tablet computer, or a wearable device. A specific type of the terminal device is not limited in this embodiment of this application.

As shown in FIG. 19, the terminal device includes components such as a processor 1901, a memory 1902, a communications module 1903, an input module 1904, a display 1905, a camera module 1906, and a sensor module 1907. Persons skilled in the art may understand that the structure of the terminal device shown in FIG. 19 does not constitute a limitation on the terminal device. The terminal device may include more or fewer components than those shown in the figure, or some components may be combined, or the components are disposed differently.

The processor 1901 may include at least one of the following types: a central processing unit (Central Processing Unit, CPU). The processor 1901 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA), a graphics processing unit (graphics processing unit, GPU), an image signal processor (image signal processor, ISP), or another programmable logic device, a discrete gate or a transistor logic device, or a discrete hardware component. The general-purpose processor may be a microprocessor, or the processor may further be any conventional processor, or the like.

A memory may be further disposed in the processor 1901, and is configured to store instructions and data. In some embodiments, the memory in the processor 110 is a cache. The memory may store instructions or data just used or cyclically used by the processor 110. If the processor 1901 needs to use the instructions or the data again, the processor 1901 may directly invoke the instructions or the data from the memory. This avoids repeated access, and reduces waiting time of the processor 1901, so that system efficiency is improved.

The memory 1902 may be configured to store a software program and a module, and the processor 1901 runs the software program and the module that are stored in the memory 1902, to perform various functional applications of the terminal device and data processing. The memory 1902 may mainly include a program storage area and a data storage area. The program storage area may store an operating system, an application program (such as a virtual mirror) needed by at least one function, and the like. The data storage area may store data (such as camera parameters, an original image, and a target image) created based on use of the terminal device, and the like. In addition, the memory 1902 may include a high-speed random access memory, or may include a non-volatile memory, such as at least one magnetic disk storage device, a flash storage device, or another volatile solid-state storage device.

The communications module 1903 is configured to receive and send a signal under control of the processor 1901, for example, receive camera parameters sent by a server, or send a request message to the server. The communications module 1903 may include a radio frequency (Radio Frequency, RF) circuit. The RF circuit usually includes but is not limited to an antenna, at least one amplifier, a transceiver, a coupler, an LNA (low noise amplifier, low noise amplifier), a duplexer, and the like. In addition, the RF circuit may further communicate with a network and another device through wireless communication. The wireless communication may use any communications standard or protocol, including but not limited to a GSM (global system for mobile communications, global system for mobile communications), a GPRS (general packet radio service, general packet radio service), CDMA (code division multiple access, code division multiple access), WCDMA (wideband code division multiple access, wideband code division multiple access), LTE (long term evolution, long term evolution), an email, an SMS (short message service, short message service), a short-distance communications technology (for example, wireless fidelity (wireless fidelity, Wi-Fi) communication), and the like.

The input module 1904 may be configured to: receive digits, characters, and voice information that are input, and generate key signal input and voice signal input related to user settings and function control of the terminal device. Specifically, the input module 1904 may include a touch panel 1904*a* and another input device 1904*b*. The touch panel 1904*a*, also referred to as a touchscreen, may collect a touch operation of a user on or near the touch panel 1904*a* (such as an operation of the user on or near the touch panel 1904*a* by using any suitable object or attachment, such as a finger or a touch pen), and drive a corresponding connection apparatus based on a preset program. Optionally, the touch panel 1904*a* may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 1901; and the touch controller can receive and execute a command sent by the processor 1901. In addition, the touch panel 1904*a* may be implemented by using a plurality of types, such as a resistive type, a capacitive type, an infrared ray type, and a surface acoustic wave type. In addition to the touch panel 1904*a*, the input module 1904 may further include the another input device 1904*b*. Specifically, the another input device 1904*b* may include but be not limited to one or more of a physical keyboard, a functional key (such as a volume control key or an on/off key), a trackball, a mouse, or a joystick.

The display 1905 may be configured to display an image, a video, and the like. The display 1905 may include a display panel 1905*a*. Optionally, the display panel 1905*a* may be configured in a form of a liquid crystal display (Liquid Crystal Display, LCD), an organic light-emitting diode (Organic Light-Emitting Diode, OLED), or the like. Further, the touch panel 1904*a* may cover the display panel 1905*a*. After detecting a touch operation on or near the touch panel 1904*a*, the touch panel 1904*a* transmits the touch operation to the processor 190 to determine a type of a touch event, and then the processor 1901 provides corresponding visual output on the display panel 1905*a* based on the type of the touch event. Although in FIG. 19, the touch panel 1904*a* and the display panel 1905*a* are used as two independent components to implement input and output functions of the terminal device, in some embodiments, the touch panel 1904*a* and the display panel 1905*a* may be integrated to implement the input and output functions of the terminal device.

The camera module 1906 captures a still image or a video. An optical image of an object is generated through a lens, and is projected onto a photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In this embodiment of this application, the camera module 1906 includes a front-facing camera 1906*a*.

The sensor module 1907 may include a pressure sensor 1907*a*, a touch sensor 1907*b*, a gyroscope 1907*c*, a magnetic induction sensor 1907*d*, an acceleration sensor 1907*e*, and the like.

The pressure sensor 1907*a* is configured to sense a pressure signal, and may convert the pressure signal into an electrical signal. In some embodiments, the pressure sensor 1907*a* may be disposed on the display 1905. There are a plurality of types of pressure sensors 1907*a*, such as a resistive pressure sensor, an inductive pressure sensor, and a capacitive pressure sensor. The capacitive pressure sensor may include at least two parallel plates made of conductive materials. When a force is applied to the pressure sensor 1907*a*, capacitance between electrodes changes. The terminal device determines pressure intensity based on capacitance change. When a touch operation is performed on the display 1905, the terminal device detects intensity of the touch operation based on the pressure sensor 1907*a*. The terminal device may also calculate a touch position based on a detection signal of the pressure sensor 1907*a*, and determine an icon tapped by the user, and the like.

The touch sensor 1907*b* is also referred to as a "touch component". The touch sensor 1907*b* may be disposed on the display 1905, and the touch sensor 1907*b* and the display 1905 constitute a touchscreen, which is also referred to as a "touchscreen". The touch sensor 1907*b* is configured to detect a touch operation performed on or near the touch sensor 1907*b*. The touch sensor may transfer the detected touch operation to the application processor, to determine a type of a touch event. A visual output related to the touch operation may be provided on the display 1905. In some other embodiments, the touch sensor 1907*b* may alternatively be disposed on a surface of the terminal device, and a location of the touch sensor 1907*b* is different from a location of the display 1905.

The gyroscope sensor 1907*c* may be configured to determine a motion posture of the terminal device. In some embodiments, angular velocities of the terminal device around three axes (that is, x, y, and z axes) may be determined by using the gyroscope sensor 1907*c*. A tilt angle of the terminal device and the like may be determined by using the angular velocity.

The magnetic induction sensor 1907*d* is configured to determine magnetic field information of the terminal device. In some embodiments, a tilt angle of the terminal device and the like may be determined by using the magnetic field information measured by the magnetic induction sensor 1907*d*.

The acceleration sensor 1907*e* is used to measure acceleration of the terminal device. In some embodiments, a tilt angle of the terminal device may be determined by using the acceleration measured by the acceleration sensor 1907*e*.

In addition, although not shown, the terminal device may further include a power supply module, an audio circuit, and the like. Details are not described herein.

An embodiment of this application further provides a computer-readable storage medium. All or some of the methods described in the foregoing embodiments may be implemented by using software, hardware, firmware, or any combination thereof. If implemented in software, the function may be stored on the computer-readable medium or transferred on the computer-readable medium as one or more instructions or code. The computer-readable medium may include a computer storage medium and a communication medium, and may further include any medium that can transfer a computer program from one place to another. The storage medium may be any available medium accessible to a computer.

In an optional design, the computer-readable medium may include a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM) or another optical disk memory, a magnetic disk memory or another magnetic storage device, or any other medium that may be used to carry, or stores required program code in a form of an instruction or a data structure, and may be accessed by a computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. All or some of the methods described in the foregoing embodiments may be implemented by using software, hardware, firmware, or any combination thereof. If the methods are implemented in the software, the methods may be all or partially implemented in a form of the computer program product. The computer program product includes one or more computer instructions. When the foregoing computer program instructions are loaded and executed on a computer, all or a part of the procedures or functions described according to the foregoing method embodiments are generated. The computer may be a general-purpose computer, a dedicated computer, a computer network, a network device, user equipment, or another programmable apparatus.

It may be clearly understood by persons skilled in the art that, for the purpose of convenient and brief description, division into the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units or modules in embodiments may be integrated into one processing unit, or each of the units may exist alone physically, or two or more units may be integrated into one unit. The integrated unit may be implemented in a form of hardware, or may be implemented in a form of a software function unit.

In addition, specific names of the function units or modules are merely provided for distinguishing between the units or modules, but are not intended to limit the protection scope of this application. For a specific working process of the units or modules in the foregoing system, refer to a corresponding process in the foregoing method embodiments. Details are not described herein again.

In the foregoing embodiments, the descriptions of embodiments have respective focuses. For a part that is not described in detail or recorded in an embodiment, refer to related descriptions in other embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A method, applied to a terminal device, wherein the method comprises:
    obtaining, in response to a first instruction entered by a user, a first offset corresponding to a first display specification, wherein the first display specification corresponds to a size of a display area to use to display a first target image or a shape of a display area to use to display the first target image, and the first offset corresponds to a position of a front-facing camera of the terminal device with respect to the display area; and
    displaying the first target image on a display of the terminal device based on the first display specification, wherein the first target image is obtained by cropping a first original image based on the first display specification, an offset between a center of the first target image and a center of the first original image is a second offset, the second offset is the first offset or is based on the first offset, and the first original image is an image shot using the front-facing camera of the terminal device as a center.

2. The method according to claim 1, wherein the first offset comprises an offset component in a first direction and an offset component in a second direction, and the first direction and the second direction are perpendicular to each other.

3. The method according to claim 1, wherein the first offset comprises a straight-line distance and an offset direction.

4. The method according to claim 1, wherein before displaying the first target image on the display based on the first display specification, the method further comprises:
    obtaining a tilt angle of the terminal device; and
    correcting the first offset based on the tilt angle, to obtain the second offset.

5. The method according to claim 1, further comprising:
    obtaining, in response to a second instruction entered by the user, a third offset corresponding to a second display specification, wherein the second instruction instructs to switch the first display specification to the second display specification; and
    displaying a second target image on the display based on the second display specification, wherein the second target image is obtained by cropping a second original image based on the second display specification, an offset between a center of the second target image and a center of the second original image is the second offset, and the second original image is an image shot by using the front-facing camera as a center.

6. The method according to claim 1, wherein the first offset is obtained from a server.

7. The method according to claim 1, wherein the first offset is obtained from preset camera parameters, the preset camera parameters comprise a stored association between at least one display specification and an offset corresponding to each display specification of the at least one display specification, and the first display specification is comprised in the at least one display specification.

8. An image display apparatus, used in a terminal device, wherein the terminal device comprises a front-facing camera and a display, and the image display apparatus comprises:
    an obtaining unit comprising a processor, wherein the obtaining unit is configured to obtain, in response to a first instruction entered by a user, a first offset corresponding to a first display specification, wherein the first display specification corresponds to a size of a display area to use to display a target image or a shape of a display area to use to display the target image, and the first offset corresponds to a position of the front-facing camera of the terminal device with respect to the display area; and
    a display unit, configured to display the target image on the display based on the first display specification, wherein the target image is obtained by cropping a first original image based on the first display specification, an offset between a center of the target image and a center of the first original image is a second offset, the second offset is the first offset or is based on the first offset, and the first original image is an image shot using the front-facing camera as a center.

9. A terminal device, comprising:
    a front-facing camera;
    a display;
    a processor;
    a non-transitory memory; and
    a computer program that is stored in the non-transitory memory and that is executable by the processor, wherein when the processor executes the computer program, the terminal device is enabled to implement the following functions:
        obtaining, in response to a first instruction entered by a user, a first offset corresponding to a first display specification, wherein the first display specification corresponds to a size of a display area to use to display a first target image or a shape of a display area to use to display the first target image, and the first offset corresponds to a position of the front-facing camera of the terminal device with respect to the display area; and
        displaying the first target image on the display based on the first display specification, wherein the first target image is obtained by cropping a first original image based on the first display specification, an offset between a center of the first target image and a center of the first original image is a second offset, the second offset is the first offset or is based on the first offset, and the first original image is an image shot by using the front-facing camera as a center.

10. The terminal device according to claim 9, wherein the first offset comprises an offset component in a first direction and an offset component in a second direction, and the first direction and the second direction are perpendicular to each other.

11. The terminal device according to claim 9, wherein the first offset comprises a straight-line distance and an offset direction.

12. The terminal device according to claim 9, wherein when executing the computer program, the processor is further enabled to implement the following functions:
   before the first target image is displayed on the display based on the first display specification, obtaining a tilt angle of the terminal device; and
   correcting the first offset based on the tilt angle, to obtain the second offset.

13. The terminal device according to claim 9, wherein when the processor executes the computer program, the terminal device is further enabled to implement the following functions:
   obtaining, in response to a second instruction entered by the user, a third offset corresponding to a second display specification, wherein the second instruction instructs to switch the first display specification to the second display specification; and
   displaying a second target image on the display based on the second display specification, wherein the second target image is obtained by cropping a second original image based on the second display specification, an offset between a center of the second target image and a center of the second original image is the second offset, and the second original image is an image shot by using the front-facing camera as a center.

14. The terminal device according to claim 9, wherein the first offset is obtained from a server.

15. The terminal device according to claim 9, wherein the first offset is obtained from preset camera parameters, the preset camera parameters comprise at least one display specification and an offset corresponding to each display specification, and the first display specification is comprised in the at least one display specification.

16. A non-transitory computer-readable storage medium, wherein the non-transitory computer-readable storage medium stores a computer program, and when the computer program is executed by a terminal device, the terminal device is configured to perform the following steps:
   obtaining, in response to a first instruction entered by a user, a first offset corresponding to a first display specification, wherein the first display specification corresponds to a size of a display area to use to display a first target image or a shape of a display area to use to display the first target image, and the first offset corresponds to a position of a front-facing camera of the terminal device with respect to the display area; and
   displaying the first target image on a display of the terminal device based on the first display specification, wherein the first target image is obtained by cropping a first original image based on the first display specification, an offset between a center of the first target image and a center of the first original image is a second offset, the second offset is the first offset or is based on the first offset, and the first original image is an image shot by using a front-facing camera of the terminal device as a center.

17. The non-transitory computer-readable storage medium according to claim 16, wherein the first offset comprises an offset component in a first direction and an offset component in a second direction, and the first direction and the second direction are perpendicular to each other.

18. The non-transitory computer-readable storage medium according to claim 16, wherein the first offset comprises a straight-line distance and an offset direction.

19. The non-transitory computer-readable storage medium according to claim 16, wherein the computer program is configured to perform the following steps:
   obtaining a tilt angle of the terminal device; and
   correcting the first offset based on the tilt angle, to obtain the second offset.

* * * * *